US007399372B2

(12) United States Patent
Okada

(10) Patent No.: US 7,399,372 B2
(45) Date of Patent: Jul. 15, 2008

(54) METHOD FOR MANUFACTURING METALLIC BELLOWS

(75) Inventor: Hideki Okada, Yokohama (JP)

(73) Assignee: NHK Spring Co., Ltd., Kanagawa (JP)

( * ) Notice: Subject to any disclaimer, the term of this patent is extended or adjusted under 35 U.S.C. 154(b) by 491 days.

(21) Appl. No.: 10/976,764

(22) Filed: Nov. 1, 2004

(65) Prior Publication Data

US 2005/0098244 A1 May 12, 2005

(30) Foreign Application Priority Data

Nov. 7, 2003 (JP) ............................ 2003-378977

(51) Int. Cl.
*C21D 8/10* (2006.01)

(52) U.S. Cl. ....................... 148/521; 148/534; 148/592; 148/593; 148/608; 148/651

(58) Field of Classification Search ................. 148/325, 148/651, 608, 592, 519, 521, 534, 593, 326; 29/90.7; 72/53

See application file for complete search history.

(56) References Cited

U.S. PATENT DOCUMENTS 4,369,074 A * 1/1983 Bodyako et al. ............ 148/566
5,685,923 A * 11/1997 Takata et al. ................ 148/325
6,564,606 B2 * 5/2003 Okada et al. ................... 72/59

FOREIGN PATENT DOCUMENTS

DE 100 27 541 A1 12/2001
JP A 01-184225 7/1989
JP 2001-304412 A 10/2001
JP A 2001-304412 10/2001
JP A 2003-172449 6/2003

OTHER PUBLICATIONS

English abstract of Japanese patent 405339628, Adachi, Shuhei, Dec. 21, 1993.*
English abstract of Japanese patent 08277417, Oct. 22, 1996.*
English abstract of Japanese patent 411207522, Makino, Taizo et al., Aug. 3, 1999.*

* cited by examiner

*Primary Examiner*—Deborah Yee
(74) *Attorney, Agent, or Firm*—Oliff & Berridge, PLC

(57) ABSTRACT

A metallic bellows, composed of precipitation hardening stainless steel, includes ridge portions and valley portions formed alternately and continuously, an average grain size of 10 to 15 μm, and compressive residual stress of not less than 500 MPa provided to at least surfaces of the ridge portions and the valleys by surface working.

4 Claims, 5 Drawing Sheets

Fatigue Test Result of First Step Honing and Second Step Honing

Fatigue Test Result

METHOD FOR MANUFACTURING METALLIC BELLOWS

BACKGROUND OF THE INVENTION

1. Field of the Invention

The present invention relates to a bellows which is used for, for example, vehicle suspension devices, gas springs, accumulators, and vacuum apparatuses, and relates to a manufacturing method for the bellows.

2. Description of the Related Art

Austenite stainless steel (Japanese Industrial Standard (=JIS)·SUS304) is often used as a material for the above metallic bellows since the austenite stainless steel is easily processed. Alternatively, precipitation hardening stainless steel is used as a material for the above metallic bellows so as to improve durability of the metallic bellows. In producing a metallic bellows, first, both longitudinal sides of a stainless steel plate having an appropriate thickness are brought into contact with each other and are connected by arc welding, so that a material pipe is produced. Next, the material pipe is cut at a predetermined length and is then subjected to cold rolling using, for example, spinning working so as to have a predetermined thickness of a bellows. After that, the pipe is subjected to solution heat treatment by heating to a solution temperature thereof, and is then subjected to plastic working such as hydraulic bulging so as to be formed into a bellows. In a case in which precipitation hardening stainless steel is used, precipitation hardening heat treatment is further performed.

In a case in which a metallic bellows is dynamically used so as to act as, for example, a spring, setting is performed so as to stabilize the loading property of the bellows after precipitation hardening heat treatment, and surface working is then performed by providing compressive residual stress to a surface of the bellows so as to improve durability thereof. The surface working is performed by shot peening in which metallic particles are shot at a surface of the bellows at high speed or by honing in which glass beads are used instead of the metallic particles (for example, paragraphs 0015 to 0022, Table 1, and FIG. 1 in Japanese Unexamined Patent Application Publication No. 2001-304412).

Austenite stainless steel such as SUS304 is better in view of workability (for example, paragraphs 0006 to 0013, and FIGS. 1, 3, 4 and 6 in Japanese Unexamined Patent Application Publication No. 2003-172449). However, a metallic bellows made of SUS304 is low in material strength, whereby the design maximum stress thereof is 850 MPa. In order to meet requirements of miniaturization and light weight of bellows in recent years, high strength materials may be used. An example of the high strength material is SUS631 of precipitation hardening semi-austenite stainless steel. When SUS 631 is used as a material for the bellows, the design stress thereof is 1100 MPa, which is about 1.3 times as large as that of a case in which SUS304 is used (for example, lower left and lower right of column 3 in Japanese Unexamined Patent Application Publication No. 1-184225).

However, when fatigue test is performed on the bellows made of SUS631, the fatigue strength of the bellows made of SUS631 is lower than that of SUS304 as shown in FIG. 8. Generally, when the material strength is increased, the workability is reduced due to decreased elongation of the material. In particular, in the metallic bellows, since bulging having large reduction rate is performed, the fatigue strength may be reduced due to material defects such as micro-cracks generated in the bulging.

SUMMARY OF THE INVENTION

Therefore, the present invention was made in consideration of the above problems, and an object of the present invention is to provide a metallic bellows which is composed of a material having high material strength and having high fatigue strength by preventing generation of material defects such as micro-cracks.

The inventor has been intensively researching metallic bellows so that the fatigue strength of the metallic bellows may be improved by appropriate working on precipitation hardening stainless steel. As a result, the inventor found that average grain size, hardness between a ridge portion and a valley portion of a bellows, and compressive residual stress of surfaces of ridge portions and valley portions of a bellows have respectively an appropriate range for a metallic bellows, and the inventor thereby made the present invention.

A metallic bellows of the present invention may be made based on the above findings. The metallic bellows composed of precipitation hardening stainless steel, comprising: ridge portions and valley portions formed alternately and continuously; an average grain size of 10 to 15 μm; and compressive residual stress of not less than 500 MPa provided to at least surfaces of the ridge portions and the valleys by surface working.

A method of manufacturing a metallic bellows of the present invention comprises steps of: cold rolling a pipe constructed such that both edges of a plate composed of precipitation hardening stainless steel are connected to each other by welding; fining an average grain size of the precipitation hardening stainless steel to 10 to 15 μm by annealing; forming the pipe into a bellows having an axial direction; precipitation age hardening heat treating the bellows; setting the bellows by tensile loading or compressive loading in the axial direction of the bellows, so that the bellows has a predetermined height with no load; and providing compressive residual stress of not less than 500 MPa to an inside face or an outside face of the bellows by surface working.

According to the present invention, yield stress is increased by fining the average grain size of the bellows to 10 to 15 μm, so that generation of slip bands can be inhibited. Length of cracks transmitted by about two grain sizes along slip bands can be decreased. Roughness of the surface of the bellows can be smoothed, and notch sensitivity thereof can thereby be relieved. In a case in which the average grain size of the bellows is more than 15 μm, effect of grain refining cannot be obtained. In a case in which the average grain size of the bellows is less than 10 μm, it is difficult to produce the bellows by controlling by annealing.

According to the manufacturing method of the present invention, since compressive residual stress of not less than 500 MPa is provided to an inside face or an outside face of the bellows by surface working, fatigue strength can be further improved. When annealing temperature is reduced, the grain size of the bellows can be fined and the surface of the bellows can be fined. Therefore, generation of micro-cracks can be inhibited.

According to the present invention, since fatigue limit is improved by fining grains of the bellows, working stress of the bellows can be set high. As a result, the number of the ridge portions of the bellows can be reduced, so that the bellows and apparatuses in which the bellows is used can be miniaturized. Material cost and manufacturing cost can be reduced because of miniaturization thereof.

DESCRIPTION OF THE PREFERRED EMBODIMENTS

Figure 1:
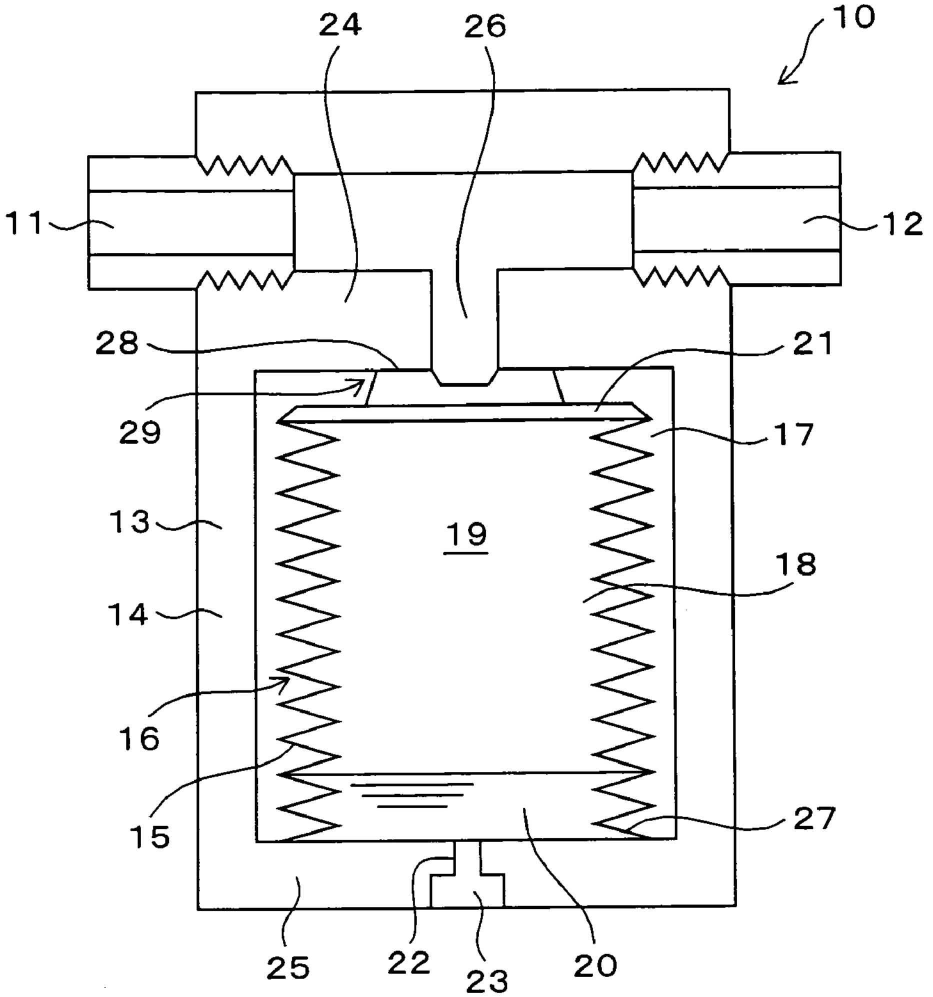
FIG. 1 is a longitudinal section showing an accumulator of an embodiment according to the present invention.

A preferred embodiment of the present invention will be described hereinafter with reference to FIGS. 1 to 7. FIG. 1 shows an accumulator 10 in which a metallic bellows 16 of the embodiment is provided. Oil generated in a pressure source (not shown in the figures) is introduced into the accumulator 10 via an inflow opening 11 and an introduction port 26. Gas 19 sealed in a gas chamber 18 and the bellows 16 are compressed by the oil introduced in the accumulator 10, so that pressure accumulation is performed in the accumulator 10. The oil is supplied to a hydraulic device (not shown in the figures) via an outflow opening 12 by the accumulated pressure of the gas so as to drive the hydraulic device.

A pressure vessel 13 of the accumulator 10 has a metallic cylindrical-shaped shell 14, and a first end member 24 and a second end member 25 which are mounted to both end portions of the metallic cylindrical-shaped shell 14 by welding, etc. The metallic bellows 16 functions as a partition member 15 partitioning an interior of the pressure vessel 13 into a hydraulic chamber 17 and the gas chamber 18. The metallic bellows 16 is composed of precipitation hardening stainless steel. A fixing end portion 27 of the metallic bellows 16 is connected to the second end portion 25 in an air-tight state by welding. A bellows cap 21 is connected to the other end side of the bellows 16 in an air-tight state by welding or caulking. The bellows cap 21 can be elastically moved together with the metallic bellows 16 in an axial direction by pressure change of oil flowing from the inflow opening 11.

In the gas chamber 18, an inert gas such as a nitrogen gas or a helium gas, or air which is used, depending on operation conditions, is sealed at a pressure higher than atmospheric pressure. The gas is injected from an injection opening 22 provided at the second end member 22. At this time, a predetermined amount of gas volume controlling liquid 20 is also injected into the gas chamber 18. After that, the injection opening 22 is closed by a plug 23 having a male screw, etc.

Figure 2:
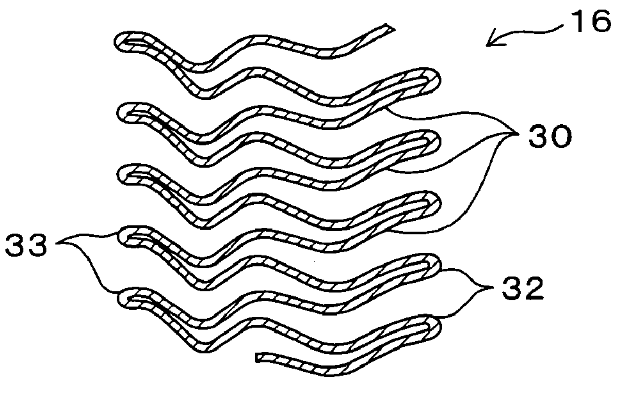
FIG. 2 is a longitudinal section of a corrugated metallic bellows provided to an accumulator of an embodiment according to the present invention.
Figure 3:
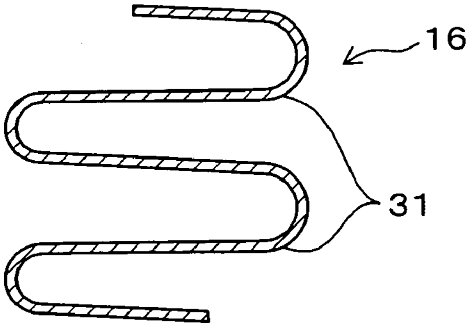
FIG. 3 is a longitudinal section of a U-shaped type metallic bellows provided to an accumulator of an embodiment according to the present invention.

A corrugated bellows shown in FIG. 2 or a U-shaped bellows 31 shown in FIG. 3 is used as the bellows 16. In the corrugated bellows, corrugations 30 having valley portions 33 and ridge portions 32 are closely contacted with each other when the bellows is maximally compressed. The U-shaped bellows 31 has a U-shaped cross section of valley portions and ridge portions. A seal member 28 composed of an elastic body such as a rubber is provided on a face of a side of the hydraulic chamber 17 of the bellows cap 21. This seal member 28 functions as a seal mechanism 29 together with the first end member 24. That is, when the pressure of the hydraulic chamber 17 is reduced, the seal member 28 contacts the first end member 24, and the oil in the hydraulic chamber 17 is prevented from flowing to the port 26. As a result, the pressure pressed on the metallic bellows 16 by the gas chamber 18 is equal to that pressed on the metallic bellows 16 by the hydraulic chamber 17, so that the damage by the pressure from the gas chamber 18 is prevented.

Figure 4:
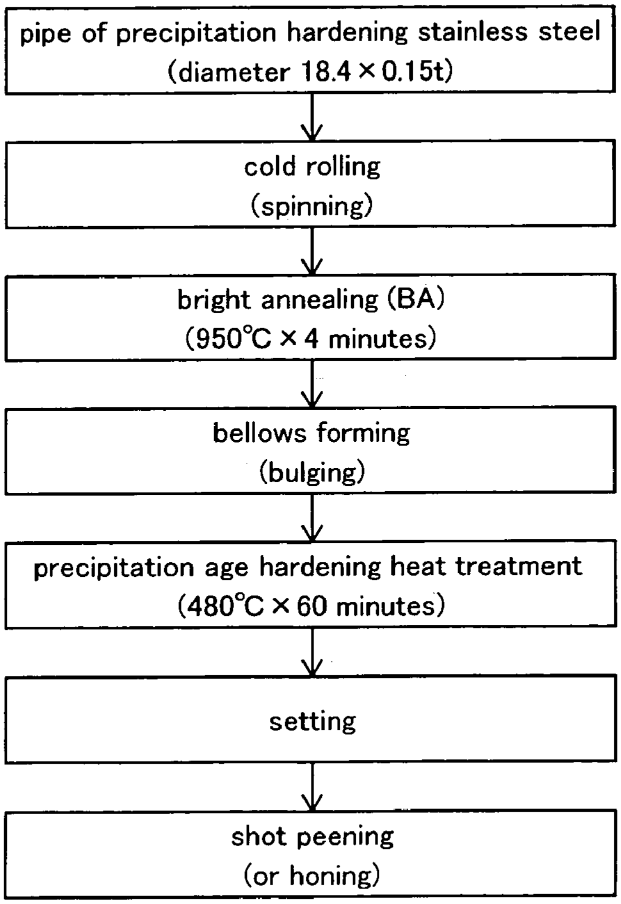
FIG. 4 is a flow chart of a manufacturing process of a metallic bellows of an embodiment according to the present invention.

FIG. 4 shows a manufacturing process for a metallic bellows. An example of a metallic bellows actually produced will be described below. First, a pipe of precipitation hardening stainless steel was subjected to cold rolling such as spinning working so as to have a predetermined wall thickness. For this example, SUS631 was used as the semi-austenite type. Alternatively, SUS633 (AM350) can be used as the semi-austenite type, and AISI1653 can be used as the austenite type. In the case of a bellows for accumulators, the precipitation hardening stainless steel having a thickness of 100 to 400 μm is used. Next, grains thereof were fined by bright annealing (BA processing). In the insides of the grains formed to be flat by cold rolling, new crystals are generated from sub-grains thereof by heating by annealing, so that grains thereof are grown. As a result, recrystallization is completed. The grains are fined so as to have an average grain size of 10 to 15 μm by controlling reduction rate of cold rolling, and temperature and time of annealing. The yield stress is increased by fining the grains, so that generation of slip bands can be inhibited. The length of cracks transmitted by about one to two grain sizes along the slip bands can be decreased. The surface roughness is smoothed, so that the notch sensitivity is relieved. In order to make the average grain size 10 to 15 μm, the reduction rate of cold rolling (cross section reduction rate) is favorably set at 3 to 40%, the temperature of annealing is favorably set 900 to 950° C., and the annealing time is favorably set at 1 to 5 minutes. Concretely, in this example, bright annealing was performed at a temperature of 950° C. for 5 minutes. For example, the reduction rate of cold rolling was set at 13%.

A metallic bellows 16 formed in the shape of a cornice by bulging as shown in FIG. 2 or 3 was obtained. In this example, after bulging, the pipe was compressed in an axial direction by pressing so as to be formed in a corrugated shape, so that the metallic bellows was produced as a corrugated bellows 30. Although the close contact of the corrugated bellows 30 can be more decreased than that of a U-shaped bellows 31, micro-cracks are easily generated in the corrugated bellows 30 since ridge portions 32 and valley portions 33 are greatly deformed. When a bellows is formed by increasing a size of a pipe, deformation of ridge portions is greater than that of valley portions, so that hardness of the ridge portions is greater than that of the valley portions. When a bellows is formed by reducing the size of a pipe, deformation of valley portions is greater than that of ridge portions, so that hardness of the valley portions is greater than that of the ridge portions.

Figure 5:
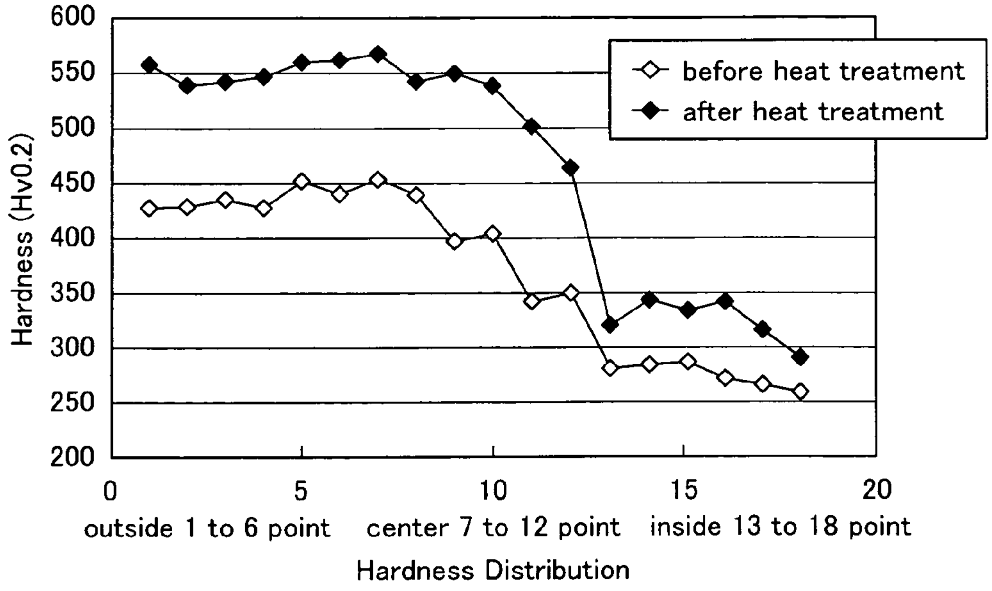
FIG. 5 is a graph showing hardness distribution of a metallic bellows of an embodiment according to the present invention.

Next, precipitation age hardening heat treatment was performed. FIG. 5 shows a case of a bellows made of SUS631 of precipitation hardening semi-austenite stainless steel which was heated to a temperature of 480° C. for an hour. FIG. 5 shows results obtained by measuring hardness of 18 points which are positioned from the outside to the inside of the bellows by a Micro Vickers hardness tester. It is confirmed that the bellows after precipitation age hardening heat treatment is harder than before the heat treatment. FIG. 5 is an example of a bellows formed by increasing the size of the pipe, the hardness of thickness direction center portion of the ridge portion is 450 to 600 Hv, and the hardness of thickness direction center portion of the valley portion is 250 to 450 Hv.

Next, the metallic bellows was subjected to setting by loading in an axial direction thereof so as to have a predetermined free height. After that, a first step honing was performed by shooting glass beads at high speed so as to provide residual stress to the inside face and the outer face of the metallic bellows. In the first step honing, the glass beads were about 0.1 mm, an aspirator type honing machine of air injection type was used, and the air pressure was about 0.3 MPa. As a result, compressive residual stress of not less than 500 MPa was provided to the outer surfaces of the ridge portions. Honing was performed by using glass beads having a size of 38 μm so as to decrease the high compressive residual stress and the roughness of the metallic bellows surface generated in the first step honing, so that the compressive residual stress of the metallic bellows surface was not less than 600 MPa.

Figure 6:
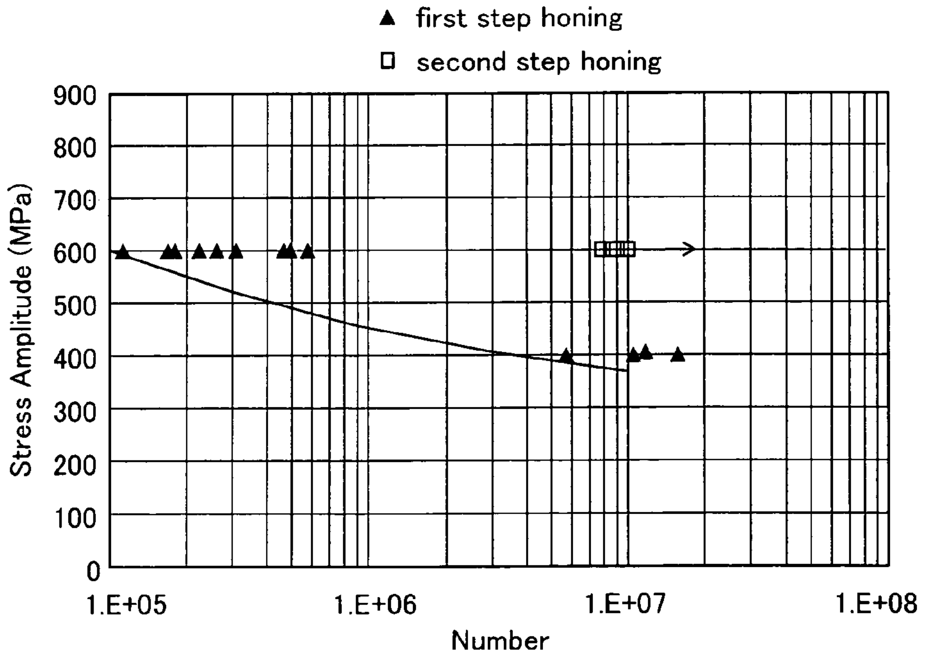
FIG. 6 is an S-N diagram showing honing numbers of a metallic bellows of an embodiment according to the present invention and fatigue test results.

In FIG. 6, fatigue test results of a case in which the first step honing was performed (▲ plotted in FIG. 6 ) and of a case in which the second step honing was further performed (□ plotted in FIG. 6). In FIG. 6, 1.E+05 denotes $1\times10^5$. When the stress amplitude is 600 MPa, the average durability number of the metallic bellows is 3.E+05 ($3\times10^5$) by performing only the first step honing. When the second step honing is further performed, the average durability number of the metallic bellows is improved 9.E+06 ($9\times10^6$), and the metallic bellows of which the average durability number is 1.E+07 ($1\times10^7$) is not damaged to fail.

The metallic bellows produced in the above manner had an average grain size of 10 to 15 μm. Table 1 shows measured results of the hardness, the compressive residual stress, the maximum surface roughness of austenite stainless steel SUS304 of the comparative example and of precipitation hardening stainless steel SUS631 of the present invention. As shown in Table 1, the example of the present invention produced by using SUS631 has high hardness, large compressive residual stress, and low surface roughness influencing the durability in comparison with the comparative example produced by using SUS304.

TABLE 1

Property comparison between SUS631 bellows and SUS304 bellows

| Item | Part | SUS304 | SUS631 |
|---|---|---|---|
| Hardness | Ridge portion | 350 to 370 | 450 to 600 |
| (Hv0.2) | Valley portion | 210 to 230 | 250 to 450 |
| Residual stress (MPa) | Ridge portion | −350 | −500 |
| Maximum surface roughness | Ridge portion | 5.0 | 4.3 |
| (μm) | Valley portion | 5.3 | 4.3 |

Figure 7:
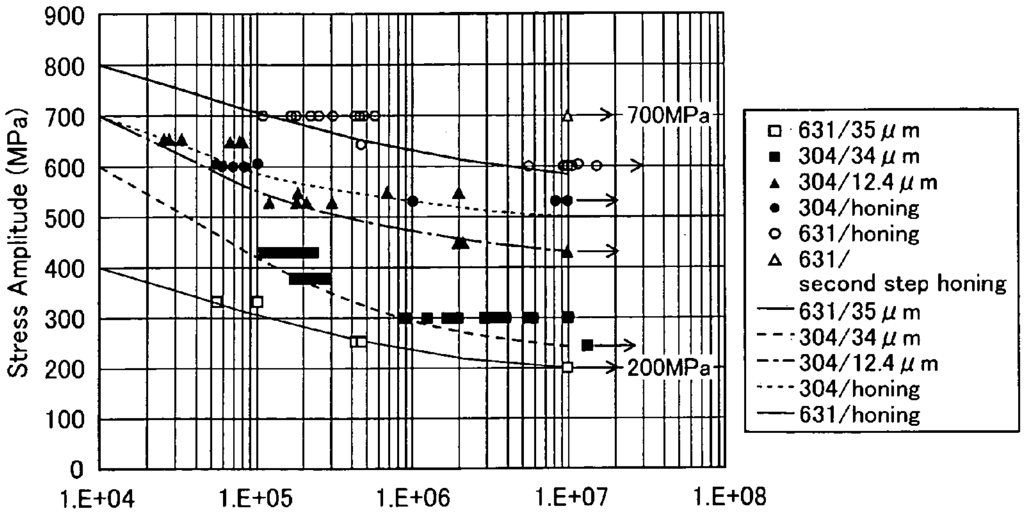
FIG. 7 is an S-N diagram showing grain sizes of a metallic bellows of an embodiment according to the present invention and fatigue test results.
Figure 8:
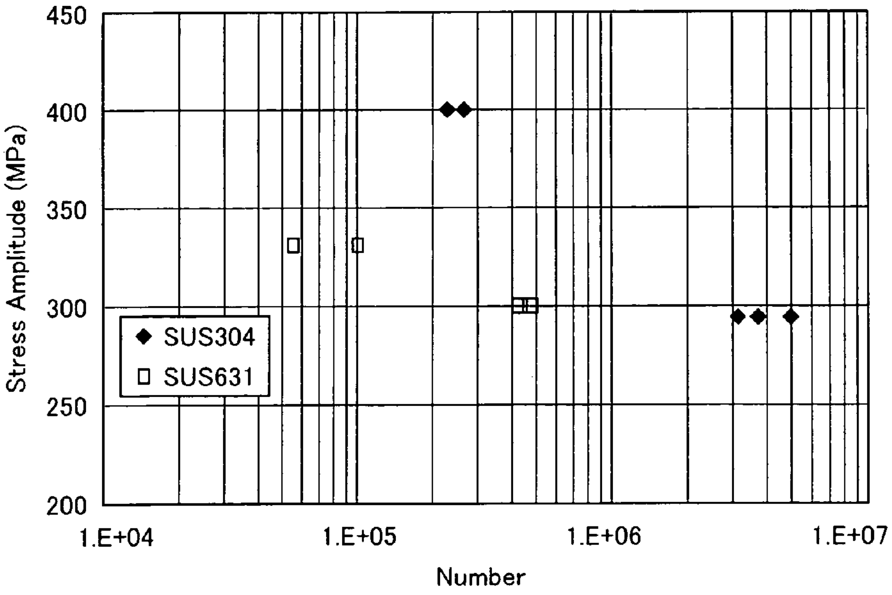
FIG. 8 is an S-N diagram showing materials of a metallic bellows of an embodiment according to the present invention and fatigue test results.

FIG. 7 shows fatigue test results of SUS631 and SUS304 produced under various conditions. Even in SUS631, the fatigue limit of a case of an average grain size of 35 μm (□ plotted in FIG. 7) is more decreased than that of SUS304 having an average grain size of 34 μm (■ plotted in FIG. 7). The fatigue limits of SUS631 having an average grain size of 12 μm which was subjected to the first step honing (○ plotted in FIG. 7) and of SUS 631 having an average grain size of 12 μm which was further subjected to the second step honing (Δ plotted in FIG. 7) are more improved than those of SUS304 having an average grain size of 12.4 μm (▲ plotted in FIG. 7) and of SUS 304 having an average grain size of 12.4 μm which was subjected to honing (● plotted in FIG. 7).

In the plots (Δ and □) of the example shown in FIG. 7, the influence of the compressive residual stress, the grain size, and the hardness of the metallic bellows on the fatigue strength is calculated, and the example and the comparative example are compared with each other based on the calculated results. The calculated results are shown in Table 2. The compressive residual stress is substantially regarded as the average stress. In this case, the compressive residual stress of 600 MPa obtained in the example described above is converted into the stress amplitude of 90 MPa based on the fatigue limit diagram, and the fatigue limit of the example was improved to be 3.05 times as large as that of the comparative example.

The grain size and the yield stress satisfy the Hall Petch relationship, and the yield stress is inversely proportional to the square root of the grain size. Assuming that the yield stress, the tensile strength, and the hardness are proportional to each other, since the hardness and the fatigue limit are proportional to each other, the fatigue limit is improved to be 1.7 times when the grain size is reduced from 35 μm of the comparative example to 12 μm of the example. When the hardness of the valley portion which is the origin of ruptures is increased from 220 Hv of the comparative example to 315 Hv of the example, the fatigue limit converted based on the hardness is improved to be 1.43 times. Since there is almost no difference in the surface roughness between the comparative example and the example, the influence thereof on the fatigue limit can be neglected. Based on the above results, the fatigue limit is anticipated to be improved to be 2.43 times in theory. In contrast, actually, the fatigue limit is improved to be 3.5 times, and is larger than the theoretical value. As a result, it is thought that the effects of a combination of fining, highly strengthening, and shot peening are generated.

TABLE 2

Comparison between theoretical value and experimental result of grain size and hardness influencing durability of metallic bellows

| | Effect | Comparative example | Example | Effect |
|---|---|---|---|---|
| Experimental result | 10 million number fatigue limit (MPa) | 200 | 700 | 3.5 times |
| | Residual stress (MPa) = Average stress | 0 | −600 | |
| | Conversion of average stress to stress amplitude (MPa) | | −90 | |
| | Fatigue limit of 1000 number after consideration of average stress (MPa) | 200 | 610 | 3.05 times |
| Calculated result | Grain size (μm) | 35 | 12 | 1.70 times |
| | $d^{-1/2}$ | 0.169 | 0.287 | |
| | Hardness (Valley portion) | 220 Hv | 315 Hv | |

TABLE 2-continued

Comparison between theoretical value and experimental result of grain size and hardness influencing durability of metallic bellows

| Effect | Comparative example | Example | Effect |
|---|---|---|---|
| σw = 1.6 Hv | 352 | 504 | 1.43 times |
| Surface roughness Ry | 4.4 | 4.3 | |
| Surface coefficient | 0.92 | 0.92 | 1.0 time |
| Total | | | 2.43 times |

Figure 9A:
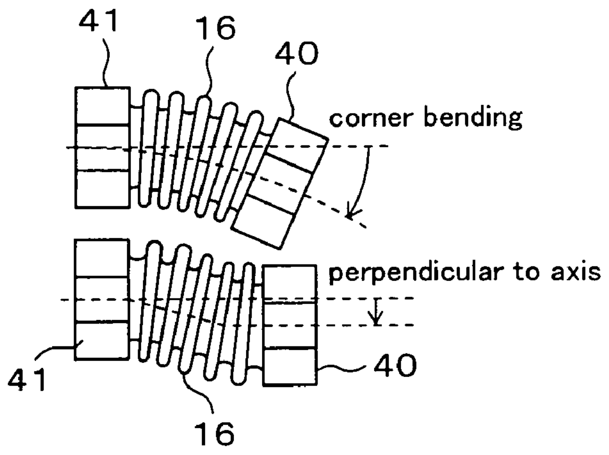
FIGS. 9 A to 9C are diagrams showing use examples of a metallic bellows of another embodiment according to the present invention.
Figure 9B:
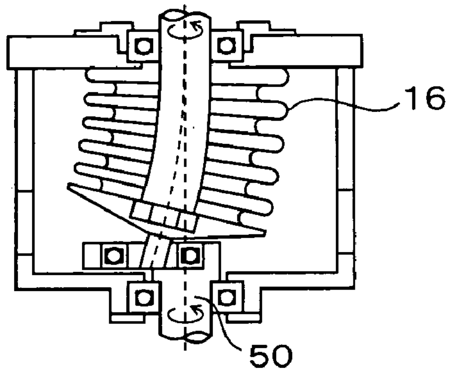
Figure 9C:
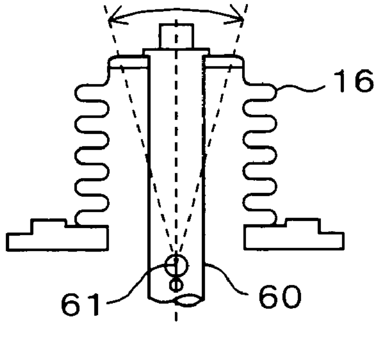

Although the above embodiment is an example of the metallic bellows of the present invention applied to an accumulator, the metallic bellows of the present invention can be applied to various apparatuses. For example, the metallic bellows 16 can be applied to a joint as shown in FIG. 9A. In this joint, a nipple 40 at an end thereof acts to be inclined with respect to a nipple 41 at another end thereof. Alternatively, the nipple 40 acts to move in parallel with the nipple 41 in a direction perpendicular to an axial direction. The metallic bellows 16 can be applied to an apparatus as shown in FIG. 9B. This apparatus shown in FIG. 9B is constructed such that another end of the metallic bellows 16 is supported by a cam 50 so as to be deflected and the metallic bellows 16 oscillates when the cam 50 is rotated. In an apparatus shown in FIG. 9C, a rod 60 is tilted around a supporting point 61 so that the metallic bellows 16 is tilted.

What is claimed is:

1. A method for manufacturing metallic bellows, comprising steps of:

cold rolling a pipe constructed such that both edges of a plate composed of precipitation hardening stainless steel are connected to each other by welding;

fining an average grain size of the precipitation hardening stainless steel to 10 to 15 μm by annealing;

forming the pipe into a bellows having an axial direction;

precipitation age hardening heat treating on the bellows;

setting the bellows by tensile loading or compressive loading in the axial direction of the bellows, so that the bellows has a predetermined height with no load; and providing compressive residual stress of not less than 500 MPa to an inside face or an outside face of the bellows by surface working, wherein in the precipitation age hardening heat treating, the bellows is hardened, thereby having a hardness of 450 to 600 Hv at a thickness direction center portion of a ridge portion and having a hardness of 250 to 450 Hv at a thickness direction center portion of a valley portion.

2. A method for manufacturing metallic bellows according to claim 1, wherein a first step surface is performed by shooting particles to a surface of the bellows, the particles having a predetermined average particle size, and then a second step surface working is performed by shooting particles to the surface of the bellows, wherein the particles in the second step surface working have an average particle size smaller than the particles in the first step surface working.

3. A method for manufacturing metallic bellows according to claim 1, wherein the bellows is a corrugated bellows in which the valley portion and the ridge portion have a corrugation-shaped cross section, and the ridge portions are closely contacted with each other and the valley portions are closely contacted with each other when the bellows is maximally compressed.

4. A method for manufacturing metallic bellows according to claim 2, wherein the first step surface working and the second step surface working are performed on an outside face and an inside face of the metallic bellows.

* * * * *